UNITED STATES PATENT OFFICE.

JULES BABÉ, OF HONFLEUR, FRANCE.

PROCESS FOR THE SEPARATION OF LEAD AND ZINC.

1,073,461.   Specification of Letters Patent.   Patented Sept. 16, 1913.

No Drawing.   Application filed April 4, 1911.  Serial No. 618,932.

*To all whom it may concern:*

Be it known that I, JULES BABÉ, a citizen of the Republic of France, and a resident of Route de Pont-Audemer, Honfleur, Seine-Inférieure, France, have invented a new and useful Process for the Separation of Lead and Zinc, of which the following is a specification.

This invention has for its object a process for the separation of the lead and zinc contained in an intimate mixture or a combination of salts or oxids of these metals.

This process is based upon the following observations: When sulfureted hydrogen or an alkaline or alkaline earth sulfid is added to the mixture or the combination of salts or oxids of zinc and lead it is the lead that first of all forms a sulfid; the zinc does not combine and does not form a sulfid until the whole of the lead has been sulfureted. It has also been recognized that this sulfid of lead in the presence of a volatile reducing agent such as cannel coal, forge coal, carbureted hydrogen, hydrogen and so forth is itself highly volatile at a temperature of about 800° C. to 900° C. and that in the same circumstances sulfid of zinc is absolutely fixed.

Given these conditions, the invention consists in adding to the mixture of salts or oxids of zinc and lead precisely the quantity of sulfureted hydrogen or of alkaline sulfid that is necessary for sulfureting the whole of the lead, in adding to this mixture a volatile reducing agent and then raising the whole to a temperature of 800 to 900° until the lead has been liberated in the condition of volatile sub-sulfid which oxidizes immediately. The reaction is according to the formula:—

$$PbO + H_2S = PbS + H_2O$$

This separation is preferably carried out in an ordinary muffle furnace but any other furnace will serve for obtaining the same reaction.

The addition of the quantity of sulfureted hydrogen necessary for sulfuration can be effected in any convenient manner and in particular in the form of blocks serving as vehicles or containers for given quantities of this addition. These blocks can be prepared in the following manner: A paste or slime is formed by mixing water containing in solution an alkaline or alkaline earth sulfid, with highly porous wood or coke carbon in the form of powder. Sulfuric acid is added to this mixture very carefully, thereby causing the formation of sulfureted hydrogen which is liberated very slowly and penetrates the pores of the carbon in proportion as it is liberated. As soon as the liberation is complete the slime is solidified by the addition of plaster; the product can be molded in the form of blocks or briquets of any size which are readily transportable and each of which contains a known quantity of sulfureted hydrogen.

What I claim and desire to secure by Letters Patent of the United States is:—

1. A process for the separation of lead and zinc contained in mixtures or combinations of salts or oxids of these metals, which consists in sulfureting the lead in the presence of a volatile reducing agent at a temperature below that at which the zinc is affected.

2. A process for the separation of lead and zinc contained in mixtures or combinations of salts or oxids of these metals, which consists in sulfureting the lead in advance of the zinc and eliminating the thus sulfureted lead without affecting the zinc.

3. A process for the separation of lead and zinc contained in mixtures or combinations of salts or oxids of these metals, which consists in sulfureting the lead in the presence of a volatile reducing agent at a temperature from 800° C. to 900° C., substantially as described.

4. A process for the separation of lead and zinc contained in mixtures or combinations of salts or oxids of these metals, which consists in heating the same to a temperature from 800° C. to 900° C. in the presence of a mixture of alkaline sulfid, and carbon powder impregnated with sulfuric acid, substantially as described.

In testimony whereof I have signed my name to this specification, in the presence of two subscribing witnesses.

JULES BABE.

Witnesses:
CHARLES DONY,
LEON PEILLET.